Aug. 18, 1970  H. M. ROSS  3,524,505
THERMALLY CURED ADHESIVELY BONDED HORSE SHOE
Filed Jan. 29, 1968  4 Sheets-Sheet 1

INVENTOR
HENRY M. ROSS
BY J. J. Crickenberger
ATTORNEY

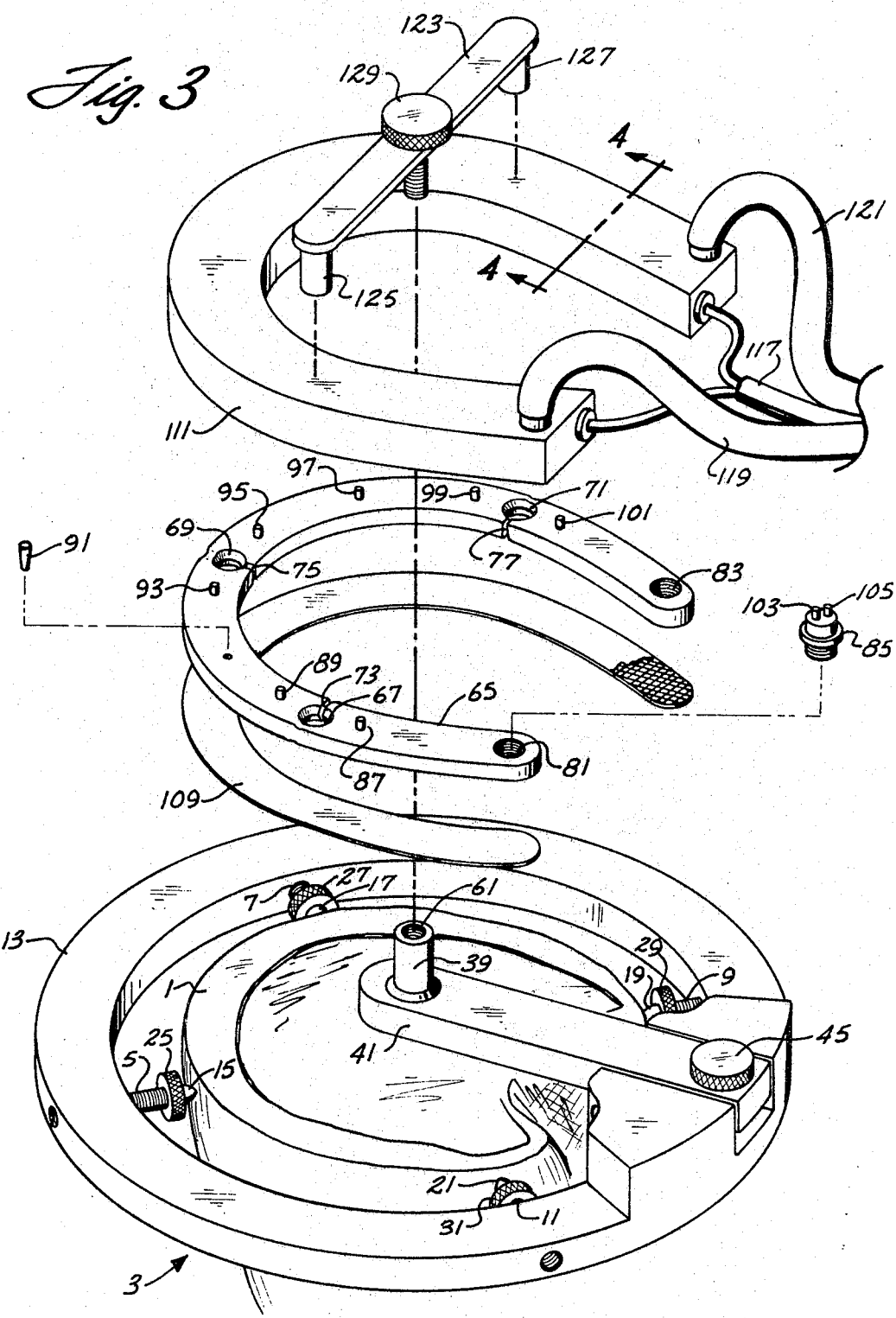

Aug. 18, 1970  H. M. ROSS  3,524,505

THERMALLY CURED ADHESIVELY BONDED HORSE SHOE

Filed Jan. 29, 1968  4 Sheets-Sheet 4

United States Patent Office 3,524,505
Patented Aug. 18, 1970

3,524,505
THERMALLY CURED ADHESIVELY BONDED HORSE SHOE
Henry M. Ross, The Lawn, Nokesville, Va. 22123
Filed Jan. 29, 1968, Ser. No. 701,188
Int. Cl. A01l 03/00, 11/00
U.S. Cl. 168—4                                    7 Claims

ABSTRACT OF THE DISCLOSURE

The method includes the steps of preparing the horse's hooves by leveling the bottom surfaces and bonding shoe members thereto. The apparatus comprises a clamping and guiding device attachable to the hoof to support a motorized planing device for leveling the hoof. A first embodiment utilizes an electrically-heated and fluid-cooled platen to fuse a shoe, pre-coated with adhesive, to the hoof. A second embodiment utilizes a special hollow shoe containing a compound for producing an exothermic metallic oxidation reduction reaction operable without external power and cooling sources. The shoes used may be formed by hand and have replaceable heels to vary the heel height. Positive traction means are provided for each shoe.

BACKGROUND OF THE INVENTION

This invention is a method and apparatus for shoeing horses and other livestock without requiring the use of nails or other mechanical fasteners.

At the present time, horses and other livestock are shoed by driving nails through previously prepared holes in metal or plastic shoes into and through the wall of the animal's hoof. After penetrating the wall, the nails are bent over or clinched to increase their holding power. The blacksmith will attempt to obtain a level bearing surface for the back of the shoe by filing the hoof with a rasp prior to the nailing operation. In some instances, the blacksmith will momentarily apply a red-hot shoe to the hoof in an attempt to improve the shoe-to-hoof contact by burning the hoof to the level of the shoe. Burning is rarely done today since shoes are factory forged and residual shaping requirements are satisfied by hammering the cold shoe. The leveling and nailing operations require considerable skill. Correct leveling insures the best possible contact and improves shoe retention. Correct nailing avoids laming the animal as a result of driving one or more nails into living tissue. The latter problem has become increasingly severe in recent years because of a tendency toward thinner walls in the hoof structure of animals which have been highly bred for greater speed and endurance.

There has been no substantial change in the time-honored method of shoeing horses for many years, although significant problems exist such as those described above. A shoe which is not properly leveled and securely fastened is likely to be thrown by the horse, thereby necessitating a re-shoeing operation. A horse whose hooves are not thick and well-developed may be difficult to shoe securely and the nails may damage the hooves. In thoroughbreds and racing stock the extremely high prices paid for such horses make it desirable to eliminate as many risks to the horse as possible. Also, the temperaments of both the horses and the owners vary widely on the question of the height of the heel to be used thereby compelling blacksmiths to stock a large number and variety of shoes with different heel heights to satisfy each particular requirement.

SUMMARY

The present invention provides for the bonding of shoes to hooves using a rapid, thermally-cured adhesive system requiring no mechanical fasteners. A special clamping fixture attached to the hoof furnishes a means for leveling accurately the animal's hoof with a motorized planing device which is precisely guided by the clamping fixture. When the hoof is leveled, the planing device is removed from the clamping fixture and a shoe, pre-coated with a thermal adhesive, is positioned on the hoof. A combination heating-cooling platen is attached to the clamping fixture in position to bear directly down on the shoe. The platen is energized to the required fusing temperature of the adhesive, and held at this temperature a sufficient time for the adhesive to cure. The platen is de-energized and a cooling fluid passed therethrough. The entire assembly may then be removed from the horse's hoof, and the shoe is ready to be used.

A novel form of shoe is utilized with the present apparatus and comprises cold-workable material, such as an aluminum alloy formed into a flat shoe. The shoe is weakened at spaced points therearound to facilitate bending by hand to conform to the shape of the hoof. Tungsten carbide pins are inserted in the bottom surface to provide traction for the horse, and the heel portions of the shoe have replaceable heel members which may be changed to produce any number of predetermined heel heights.

A second embodiment of the apparatus replaces the combination heating-cooling platen with a plain platen to be used with a segmented shoe member having a hollow interior filled with a compound to produce heat by an exothermic chemical reaction.

BRIEF DESCRIPTION OF THE DRAWING

FIG. 3 is an exploded perspective view of a first embodiment of the invention utilizing a combination heating-cooling platen to fuse the shoe in position;

DESCRIPTION OF THE PREFERRED EMBODIMENTS

Figure 1:
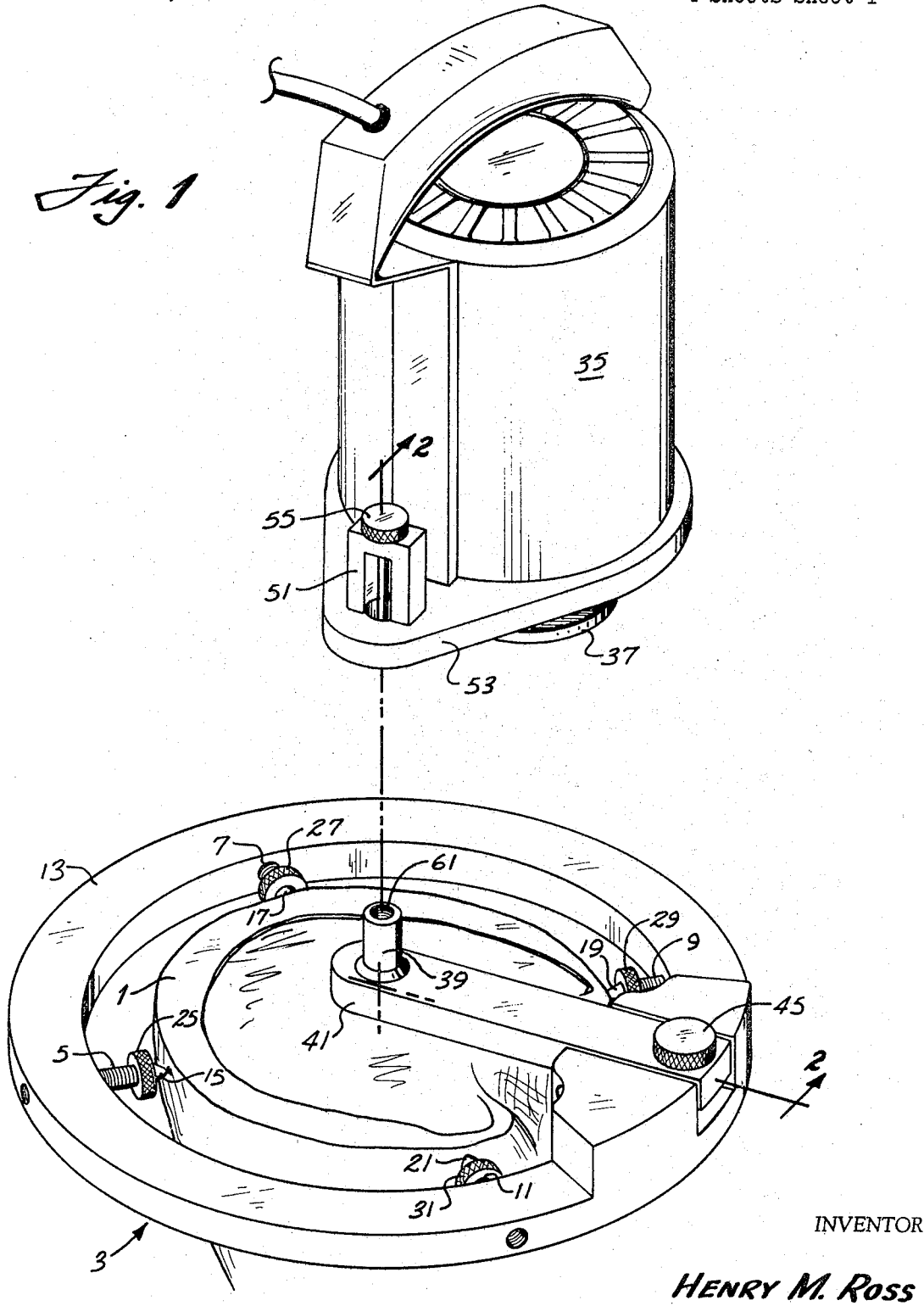
FIG. 1 is an exploded perspective view of the clamping fixture in position on a horse's hoof with the motorized planing device in position to level the hoof.

The invention will be understood more readily by referring to FIG. 1 of the drawings which shows the preliminary step in the method of the invention and a portion of the apparatus utilized. A horse's hoof 1 is placed within the clamping fixture 3, and held securely therein by means of radially movable supports 5, 7, 9 and 11. Each of these supports is threadedly mounted in the inner surface of ring member 13. The supports 5, 7, 9 and 11 terminate in spear points 15, 17, 19, and 21. Knurled discs 25, 27, 29, and 31 facilitate hand adjustment of these supports when the hoof is to be secured or released from the clamping fixture 3.

Figure 2:
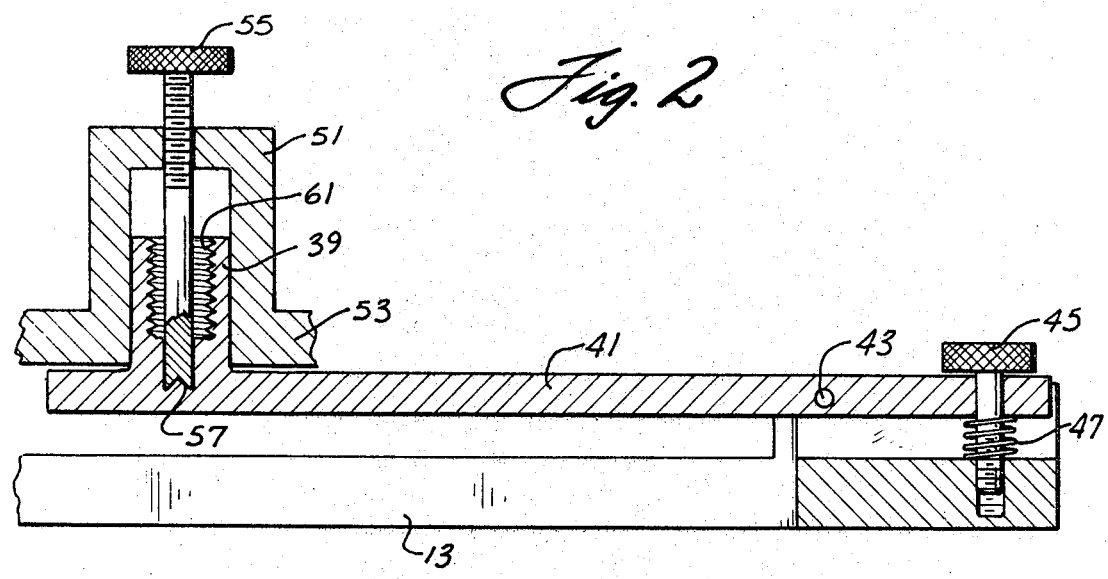
FIG. 2 is a cross-sectional view taken along lines 2—2 of FIG. 1.

A motorized rotary planer device 35 having an appropriate sanding or cutting disc 37 is positioned on a pivot post 39 attached to adjustable bar 41. The adjustable bar 41 is pivotally mounted on ring 13 by pivot pin 43 as shown in FIG. 2. Adjustment screw 45 is threaded into ring member 13 and biased by means of spring 47 to vary the angle of adjustable bar 41 to the plane of the horse's hoof. This feature is desirable when it is necessary to change the heel-to-toe angle of the horse's hoof prior to shoeing the hoof.

A yoke member 51 mounted on the base plate 53 of the rotary planing device 35 provides the necessary vertical adjustment of planing device 35 relative to the hoof 1. A vertically movable adjustment screw 55 is threadedly mounted in yoke 51 and extends downwardly to terminate in an inverted conical tip 57. The interior surface of the pivot post 39 has a complementary conical shape to receive adjustment screw 55 and establish the desired height adjustment. The interior threads 61 in pivot post 39, shown in FIG. 2, are for a purpose to be described later.

In operation the rotary planing device 35 is mounted by means of a conventional sleeve bearing (not shown) on pivot pin 39 and the desired angular and height adjustments are made. The planing device 35 is then simply rotated around pin 39 to produce a true planar surface on the bottom of hoof 1. When this is accomplished the planing device 35 is lifted off of pivot pin 39, and the actual shoeing operation is begun. It will be appreciated that the planing operation may also be performed by hand with appropriate modifications of the clamping fixture to permit free access to the hoof surface.

FIG. 3 is an exploded perspective of the apparatus performing the actual shoeing. The horseshoe 65 may be any durable metal or plastic material, but excellent results have been obtained using an aluminum alloy material which combines strength with good thermal conductivity. The shoe 65 has a plurality of holes 67, 69 and 71 having slots 73, 75 and 77, respectively, extending from the circumference thereof to the interior portion of the shoe. This structure produces a weakened shoe which may be formed readily by hand to fit the horse's hoof. Since the shoe is to be fastened to the hoof by an adhesive, this weakening does not affect the strength or durability of the shoe after the shoeing operation is completed. Indeed, it will be shown later that a segmented shoe may be employed. The holes are edge-relieved from both sides and the narrowed section is reduced slightly from its original plate thickness by rounded, shallow indentations (on both sides approximately .02" deep by .08" wide) 48. This relieving reduces the likelihood of fracture during forming and prevents surface bulging.

The heel portions of the shoe are provided with threaded holes 81 and 83 into which may be threaded replaceable heel members such as shown at 85 to vary the heel height as desired. A plurality of tapered tungsten carbide pins 87, 89, 91, 93, 95, 97, 99 and 101, which have a relative hardness much greater than the aluminum alloy shoe, are shown in spaced relation around the ground-engaging surface of shoe 65 to provide increased traction for the horse on slippery surfaces such as ice. The heel member 85 may have one or more tungsten carbide pins as shown at 103 and 105. These pins may be approximately 0.1 inch in diameter and 0.3 inch long. They are embedded with an interference fit so that about 0.06 inch protrudes.

The surface of horse shoe 65 which is to mate with the bottom surface of hoof 1 is cleaned, chemically etched, and coated with a thin film of nitrile phenolic thermoplastic material or a similar adhesive. The film layer may be typically 0.015 inch thick, and is partially cured on the shoe during manufacture. This adhesive may be reinforced, if desired, by a scrim-cloth layer of crinoline or fiberglass material, and the layer of reinforced adhesive is shown at 109 in FIG. 3 of the drawing.

Figure 4:
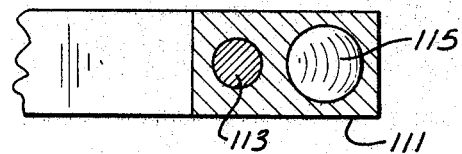
FIG. 4 is a cross-sectional view taken along lines 4—4 of FIG. 3.

A combination heating-cooling platen 111 is made of a thermally conductive material such as aluminum, and has a resistance heating element 113 and a hollow passageway 115 for cooling fluid, as shown in FIG. 4. The resistance heating element 113 is designed to be connected to a conventional 115 volt outlet by means of electrical cord 117. Cooling fluid is circulated in passageway 115 by means of tubes 119 and 121. Tube 119 may be connected to a conventional household water outlet, and tube 121 may be discharged directly onto the ground, since only a small amount of cooling fluid is required in any one cooling operation. The platen is held in position by means of mounting bracket 123 having depending feet 125 and 127. These feet are urged into contact with the top of platen 111 by means of adjustment screw 129, which is threadedly mounted into the interior thread 61 at pivot pin 39. When it is in position, the heat-transferring base of platen 111 is in a plane perpendicular to the axis of pivot post 39.

Figure 5:
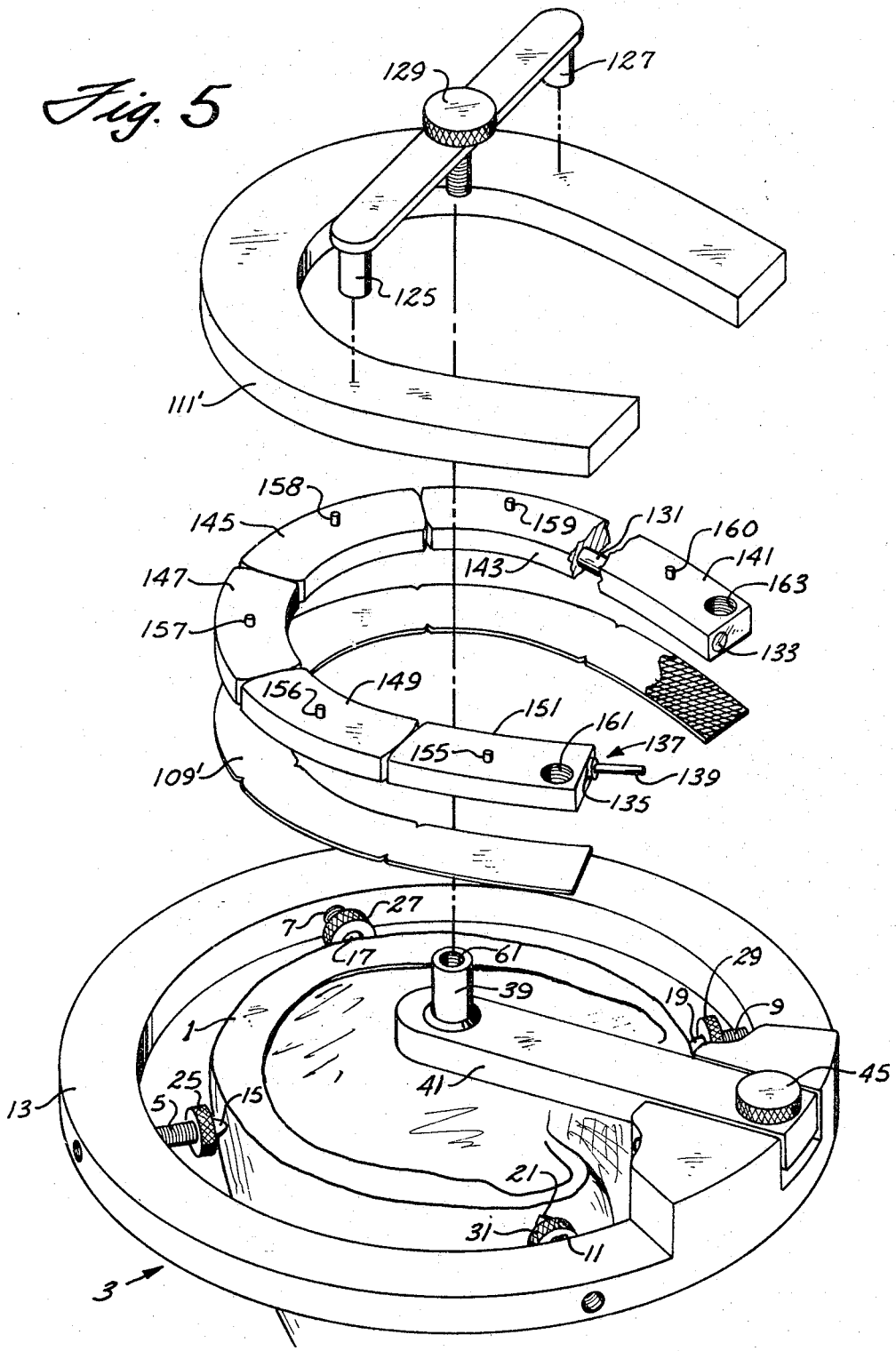
FIG. 5 is an exploded perspective view of a second embodiment of the invention utilizing a segmented shoe in which an exothermic metallic oxidation reduction reaction is used to fuse the shoe in position.

FIG. 5 illustrates a second embodiment of the invention in which a segmented shoe is employed with a platen member having no provisions for heating or cooling.

The segmented shoe comprises a hollow metal tube 131 having one end 133 formed shut, and the opposite end 135 left open for filling. The tube is filled with a compound designed to produce heat by chemical reaction such as exothermic metallic oxidation-reduction. It has been found that magnesium and cupric oxide, mixed together in proportions determined by their molecular weight, form an excellent material for this purpose. The proportions are approximately three parts of cupric oxide to one part of magnesium, the molecular weights being 79 and 24, respectively. This powder compound is used to fill tube 131 from end 135. End 135 is then closed by inserting a mechanical igniter and sealing it in place with a compound such as a rubber which is vulcanizable at room temperature. The mechanical igniter 137 may comprise any commercially available igniter, or may be made up simply by wrapping the striking surface of a match box around the head of a match and sealing it in position in end 135. When the match 139 is pulled out of the tube, the magnesium will ignite and immediately raise the tube to the desired temperature.

The tube 131 forms the core of the segmented horse shoe. Elongated metallic segments 141, 143, 145, 147, 149 and 151 having holes therethrough allowing a press fit over tube 131 are assembled on tube 131 and bent into the desired shape. One surface of this segmented assembly is then coated with a suitable adhesive 109' as described previously in connection with the apparatus in FIG. 3. Similarly, the other side of the metallic segments are provided with tungsten carbide pins and replaceable heel elements as previously described. The tungsten carbide pins are shown at 155 to 160, and threaded holes 161 and 163 are provided to receive the replaceable heel elements. The platen 111' is similar to platen 111 except for the presence of the resistance heating element and fluid passageway.

In practice, the horse's hoof is prepared initially in the manner similar to that for conventional nailed shoes; i.e. the old shoe is removed, dirt accumulation is scraped off the bottom of the hoof, and excess hoof growth is trimmed with end nippers. Then, the clamping fixture 3 is placed over the hoof 1 so that the bottom of the hoof just contacts the underside of the adjustable bar 41 when the bar 41 is parallel to the plane of the ring 13. The hoof 1 is roughly centered within the ring 13, and the radially movable supports 5, 7, 9 and 11 are adjusted to converge on the hoof until the short spear points 15, 17, 19 and 21 firmly engage the hoof wall.

The motorized rotary planer device 35 is positioned on pivot post 39, and the depth of cut is adjusted as desired. The heel-to-toe cutting angle is adjusted by means of adjustment screw 45 which inclines the axis of pivot post 39. The bottom of the hoof 1 is machined by successive sweeps of the planer head about the pivot post axis until a uniform bonding surface is obtained. Cutting action of the head is always planar, and depth as well as plane angle are always under positive control. The width of the cutter or sanding disc 37 is sufficient to cover most hoof plan forms with a fixed radius between the spin axis of the planar device 35 and the pivot post axis 39; however, the motor of the rotary planar device 35 may be eccentrically mounted within its frame support so that rotation of the motor case will vary the distance between the motor axis and the pivot post axis to handle extreme cases.

The planing device 35 is then removed from pivot pin 39, and a shoe of appropriate size and type is selected. The shoe may be hand-formed to the best possible conformation with the hoof planform. The shoe is then placed in its proper mating position over the hoof, and the platen member is placed over the shoe, clamping it to the hoof by means of mounting bracket 123 and adjustment screw 129.

Heat is applied to the shoe until the adhesive material fuses as determined either by visual inspection of the bonding line or by suitable temperature measurement devices. In the embodiment of the apparatus shown in FIG. 3 the heating element is denergized and a cooling fluid is passed through the passageway of platen 111. In the embodiment of FIG. 5 the heat from the shoe is dissipated by the platen 111'.

The clamping fixture 3 is then removed, and the hoof may be filed on the side to remove any small remaining protrusions and the bonding job is complete. Heels of verying height may be attached as desired by threading them into the holes provided for that purpose.

While the invention has been shown and described with particular reference to a preferred embodiment, it will be understood by those skilled in the art that various changes in form and details may be made without departing from the spirit and scope of the invention.

What is claimed is:
1. A horseshoe for attachment to the foot of a horse by a thermal adhesive bonding process,
said horseshoe comprising a hollow passageway containing a compound for producing heat by chemical reaction.
2. The combination according to claim 1 wherein said chemical reaction is an exothermic metallic oxidation-reduction.
3. The combination according to claim 2 wherein said compound comprises a mixture of cupric oxide and magnesium.
4. The combination accordance to claim 1 wherein the surface of said horseshoe to be disposed against the horse's foot has a coating of thermally-activated adhesive material.
5. The combination according to claim 4 wherein said thermally-activated adhesive material is a nitrile phenolic thermoplastic material.
6. The combination according to claim 1 comprising means for igniting said compound to produce said exothermic chemical reaction.
7. A horseshoe for use in a thermal bonding process comprising
a segmented, flat shoe member,
said member having a plurality of cross-sectional areas of reduced thickness formed between adjacent segments,
said segmented shoe member having a hollow passageway containing a compound for producing an exothermic chemical reaction, and
means for detachably mounting heel members of varying height on said flat shoe member.

References Cited

UNITED STATES PATENTS

| | | | |
|---|---|---|---|
| 526,051 | 9/1894 | Poupard | 168—7 |
| 740,281 | 9/1903 | Jennings | 168—29 |
| 893,592 | 7/1908 | McGowen | 168—48 |
| 973,053 | 10/1910 | Langford | 168—48 |
| 2,024,265 | 12/1935 | Anderson et al. | 168—4 |
| 2,137,062 | 11/1938 | Raz-Ammann | 168—29 |
| 2,499,098 | 2/1950 | Howe | 168—48 |
| 2,523,368 | 9/1950 | Howe | 168—48 |
| 3,050,133 | 8/1962 | Ketner et al. | 168—4 |
| 3,200,885 | 8/1965 | Johnson | 168—12 |
| 3,302,723 | 2/1967 | Renkenberger | 168—4 |

FOREIGN PATENTS 21,171    8/1930    Australia.

ALDRICH F. MEDBERY, Primary Examiner

U.S. Cl. X.R.
168—29, 48